(12) United States Patent
Tanaka

(10) Patent No.: US 12,536,823 B2
(45) Date of Patent: Jan. 27, 2026

(54) INFORMATION PROCESSING DEVICE, INFORMATION PROCESSING METHOD, AND PROGRAM

(71) Applicants: KABUSHIKI KAISHA TOSHIBA, Tokyo (JP); Toshiba Digital Solutions Corporation, Kawasaki (JP)

(72) Inventor: Ryohei Tanaka, Kawasaki (JP)

(73) Assignees: Kabushiki Kaisha Toshiba, Kawasaki Kanagawa (JP); Toshiba Digital Solutions Corporation, Kawasaki Kanagawa (JP)

( * ) Notice: Subject to any disclaimer, the term of this patent is extended or adjusted under 35 U.S.C. 154(b) by 399 days.

(21) Appl. No.: 18/054,493

(22) Filed: Nov. 10, 2022

(65) Prior Publication Data

US 2023/0070150 A1 Mar. 9, 2023

Related U.S. Application Data

(63) Continuation of application No. PCT/JP2021/017357, filed on May 6, 2021.

(30) Foreign Application Priority Data

May 15, 2020 (JP) ................................. 2020-086219

(51) Int. Cl.
*G06V 30/00* (2022.01)
*G06V 10/10* (2022.01)
(Continued)

(52) U.S. Cl.
CPC ............. *G06V 30/18* (2022.01); *G06V 10/10* (2022.01); *G06V 10/26* (2022.01); *G06V 10/82* (2022.01); *G06V 30/194* (2022.01)

(58) Field of Classification Search
CPC ........ G06V 30/18; G06V 10/10; G06V 10/26; G06V 10/82; G06V 30/194; G06N 3/02; G06T 7/00
See application file for complete search history.

(56) References Cited

FOREIGN PATENT DOCUMENTS

| JP | H6-251195 A | 9/1994 | |
|----|----|----|----|
| WO | WO-2020012700 A1 * | 1/2020 | ........... G06F 18/213 |

OTHER PUBLICATIONS

Ito et al, low-frequency character clustering for end-to-end ASR system, Proceedings, APSIPA Annual Summit and Conference, pp. 187-191 (Year: 2018).*

(Continued)

*Primary Examiner* — Xiao Liu
(74) *Attorney, Agent, or Firm* — Finnegan, Henderson, Farabow, Garrett & Dunner, LLP

(57) ABSTRACT

An information processing device includes a feature quantity acquiring unit, a range estimating unit, an associating unit, an integrating unit, and an output unit. The feature quantity acquiring unit acquires a feature quantity extracted from data consisting of a plurality of values. The range estimating unit estimates a range of the data in which an element to which a predetermined label is to be assigned may be present from the acquired feature quantity. The associating unit associates each label with at least one of a plurality of feature quantities. The integrating unit performs integration processing of integrating one or more ranges of the data estimated from each of one or more feature quantities that are associated with the label into one range of the data. The output unit outputs a correspondence relationship between the label and the range of the data that has been subjected to the integration processing.

25 Claims, 14 Drawing Sheets

(51) Int. Cl.
*G06V 10/26* (2022.01)
*G06V 10/82* (2022.01)
*G06V 30/18* (2022.01)
*G06V 30/194* (2022.01)

(56) References Cited

OTHER PUBLICATIONS

Yin et al, Scene Text Recognition with Sliding Convolutional Character Models, arXiv:1709.01727v1 Sep. 6, 2017.*

* cited by examiner (A)

| | WEIGHT OF F3 | WEIGHT OF F4 |
|---|---|---|
| LEFT END | 1.0 | 0.0 |
| RIGHT END | 0.0 | 1.0 |
| TOP END | 0.5 | 0.5 |
| BOTTOM END | 0.5 | 0.5 |

(B)

(C)

INFORMATION PROCESSING DEVICE, INFORMATION PROCESSING METHOD, AND PROGRAM

CROSS-REFERENCE TO RELATED APPLICATION

This is a Rule 53(b) continuation of International Application No. PCT/JP2021/017357, filed May 6, 2021, which claims the benefit of Japanese Application No. 2020-086219, filed May 15, 2020, the contents of each of which are incorporated herein by reference in their entireties.

TECHNICAL FIELD

Embodiments of the present invention relate to an information processing device, an information processing method, and a program.

BACKGROUND ART

In recognition of a series of labels such as speech recognition and character string recognition, it is known that recognition accuracy can be improved by combining a deep neural network (DNN) and a series label recognition technology such as connectionist temporal classification (CTC) and recognizing boundaries between labels without separating them explicitly. On the other hand, in series label recognition using series label recognition technology such as CTC, since the boundaries between labels are not separated in a label string that is a result of recognition, ranges of labels corresponding to the results of recognition are unknown. In series label recognition using series label recognition technology such as CTC, there has been a request to know the ranges of labels corresponding to each recognition result. Conventionally, there are methods for estimating regions for each character from a character string image, but these methods are completely different from the series label recognition technology such as CTC, and cannot attain consistency with the highly accurate recognition technology of the series label recognition technology such as CTC.

CITATION LIST

Patent Document

[Patent Document 1]
Japanese Unexamined Patent Application, First Publication No. H6-251195

SUMMARY OF INVENTION

Technical Problem

An object of the present invention is to provide an information processing device, an information processing method, and a program that can make it possible to specify the ranges of input data corresponding to each label in a label string that is a result of recognition in recognition processing of a series of labels in which the boundaries between the labels are not explicitly separated.

Solution to Problem

An information processing device of an embodiment includes a feature quantity acquiring unit, a range estimating unit, an associating unit, an integrating unit, and an output unit. The feature quantity acquiring unit acquires a feature quantity extracted from data consisting of a plurality of values. The range estimating unit estimates a range of the data in which an element to which a predetermined label is to be assigned is present from the acquired feature quantity. The associating unit associates each label of a label string having a plurality of labels with at least one of a plurality of feature quantities. The integrating unit performs integration processing of integrating one or more ranges of the data estimated from each of one or more feature quantities that are associated with the label into one range of the data. The output unit outputs a correspondence relationship between the label and the range of the data that has been subjected to the integration processing.

DESCRIPTION OF EMBODIMENTS

Hereinafter, an information processing device, an information processing method, and a program of the embodiments will be described with reference to the drawings.

Prior Art

Figure 11:
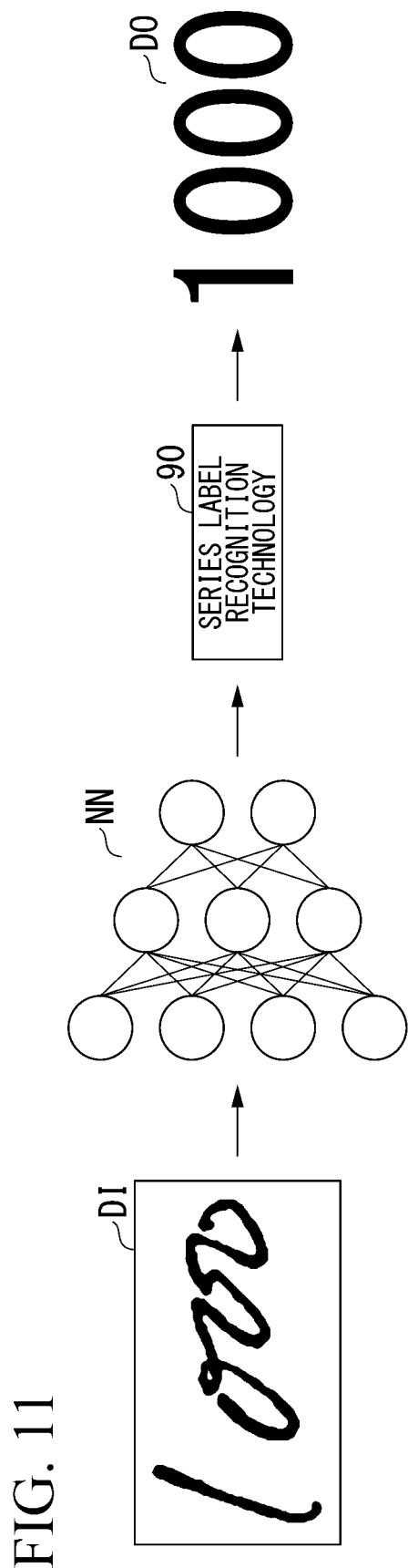
FIG. 11 is a schematic diagram of a series recognition problem according to the prior art.

A conventional series label recognition technology will be described with reference to FIGS. 11 to 13. FIG. 11 is a schematic diagram of a series recognition problem according to the prior art. First, input data DI is input to a neural network NN. In this example, an example of a case in which the input data DI is an image will be described. The neural network NN calculates a probability distribution of the input input data DI for each series of feature quantities. The probability distribution for each series of feature quantities calculated by the neural network NN is integrated by a series label recognition technology 90. The series label recognition technology 90 is, for example, a method such as CTC. The series label recognition technology 90 integrates the probability distribution for each series of feature quantities and calculates the probability distribution of a character string. Output data DO is output based on the calculated probability distribution of the character string. In an example of a case in which the input data DI is an image, the output data DO is a character string that is a result of character recognition of the input data DI.

Figure 12:
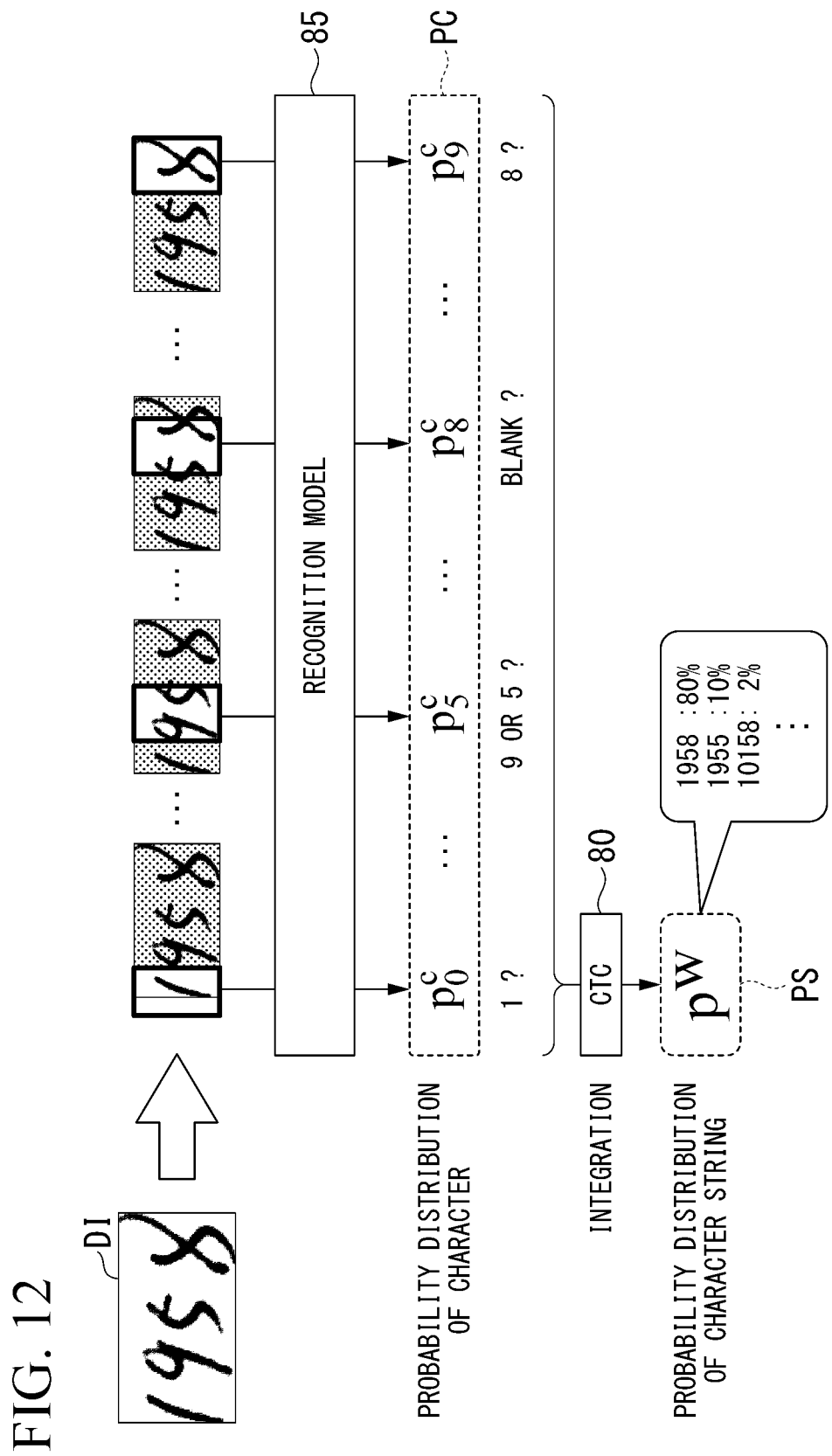
FIG. 12 is a schematic diagram of a series label recognition technology according to the prior art.

FIG. 12 is a schematic diagram of the series label recognition technology according to the prior art. A recognition model 85 calculates a probability distribution PC for each character while moving a determination range for the input input data DI little by little. The recognition model 85 is configured using, for example, the neural network NN. In this example, an example of a case in which the input data DI is a character string image in which "1958" is handwritten in a horizontal direction from left to right will be described.

Figure 13:
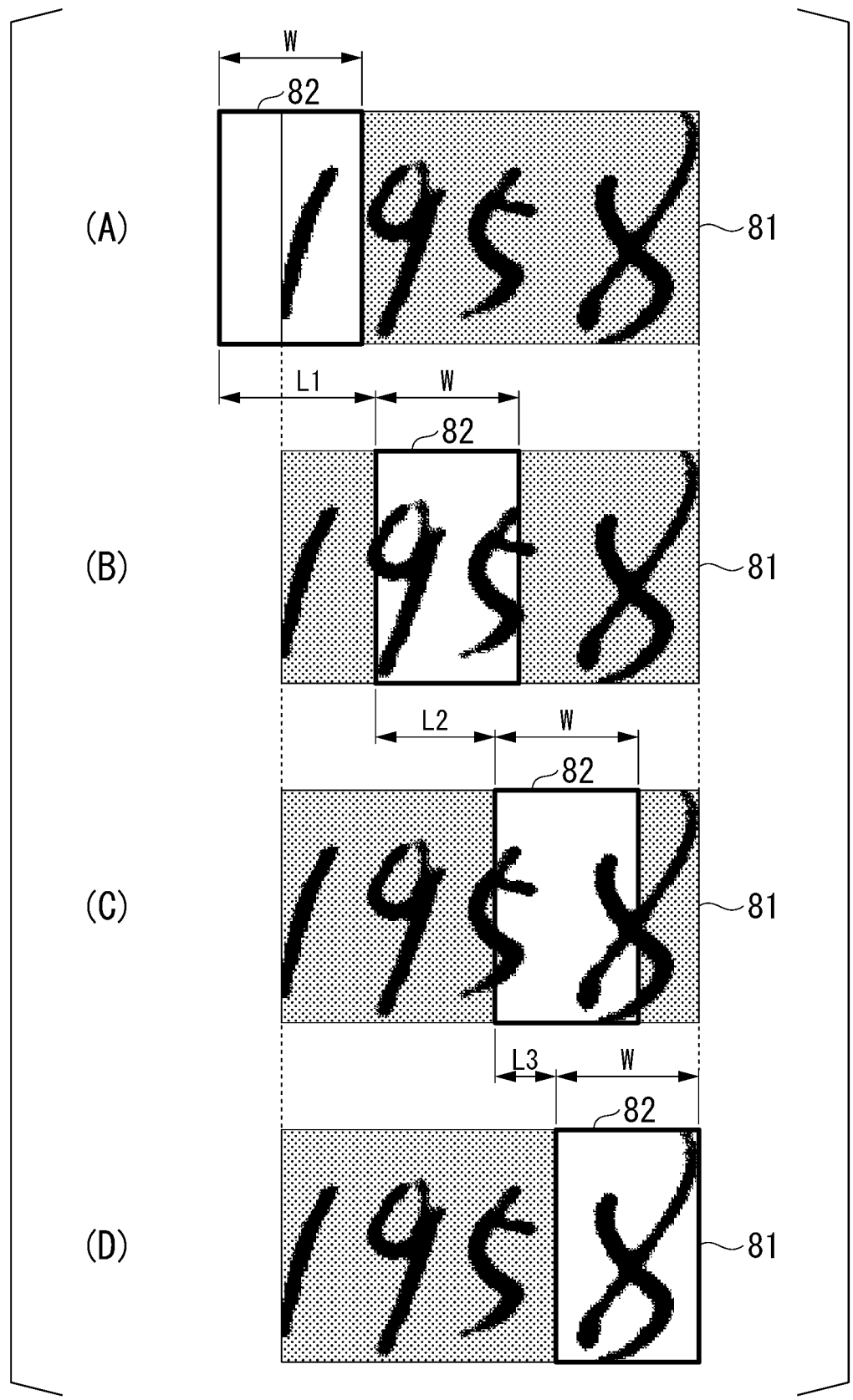
FIG. 13 is a diagram for describing a determination range of the series label recognition technology according to the prior art.

FIG. 13 is a diagram which describes a determination range of the series label recognition technology according to the prior art. In this example, since the input data DI is a character string image handwritten in a horizontal direction from left to right, the recognition model 85 calculates the probability distribution PC for each character while moving a determination range 82 from left to right. That is, the probability distribution PC for each character is a probability distribution corresponding to the determination range 82.

The determination range 82 is a range having a width W in a character string direction of the input data DI. The determination range 82 has a size that allows each character of a character string written in the input data DI to be recognized. The recognition model 85 keeps the width W of the determination range 82 constant and calculates the probability distribution PC for each character while moving the determination range 82 from left to right by a predetermined distance.

First, the recognition model 85 calculates the probability distribution PC in the determination range 82 in FIG. 13(A). Next, the recognition model 85 calculates the probability distribution PC in the determination range 82 with a range obtained by shifting the range 82 to the right by a predetermined distance set as the determination range 82. The procedure described above is repeated until the range 82 reaches a right end of an image. FIGS. 13(B), 13(C), and 13(D) show a state in which ranges shifted by distances L1, L1+L2, and L1+L2+L3 from a position of (A) are set as the range 82, respectively.

A distance to move the determination range 82 is set in advance in consideration of a width of an element to be recognized (in this example, the width of a character).

Returning to FIG. 12, the probability distribution PC calculated for each determination range 82 by the recognition model 85 is integrated by a CTC 80 to calculate the probability distribution PS of a character string. The probability distribution PS of a character string is the probability distribution of a character string that is recognized without separating boundaries between labels of the input data DI.

Here, since the boundaries between labels are not separated in the character string recognized by the probability distribution PS, a range of a label corresponding to a result of the recognition is unknown. In the present embodiment, a range of input data corresponding to each label is specified in a label string that is a result of the recognition.

First Embodiment

The information processing device according to the present embodiment is applied to processing for obtaining a recognition result of the series recognition problem using the series label recognition technology such as CTC as described above. In the first embodiment, an example of a case in which CTC is used as an example of the series label recognition technology will be described.

Specific examples of the series recognition problem to which the information processing device according to the present embodiment is applied broadly include recognition processing such as character string recognition, voice recognition, and video recognition. In the present embodiment, character string recognition is treated as an example of a label string recognition task. Character string recognition is a task of using an image including a character string as an input and recognizing the character string in the image. In the present embodiment, a horizontal character string that is read from left to right will be described. Note that the present embodiment is not limited to a horizontal character string that is read from left to right, and the same applies to a vertical character string. The image including a character string broadly includes an image of handwritten characters, a photographed signboard, a road sign, and the like.

Figure 1:
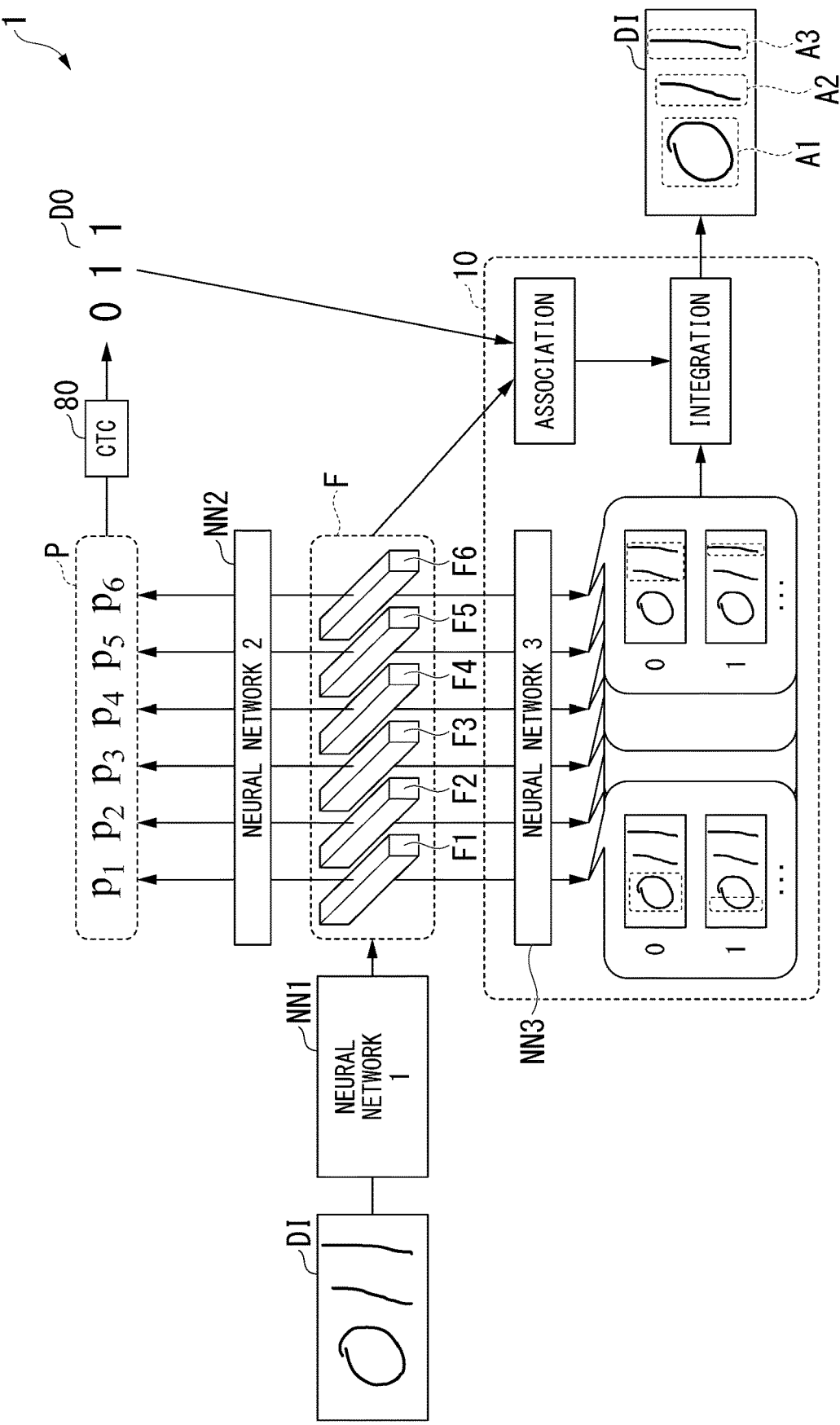
FIG. 1 is a schematic diagram which shows an example of a functional configuration of an information processing system according to a first embodiment.

FIG. 1 is a schematic diagram which shows an example of a functional configuration of an information processing system 1 according to a first embodiment. The functional configuration of the information processing system 1 will be described with reference to FIG. 1. First, the input data DI is input to a neural network NN1. In this example, an example of a case in which the input data DI is an image of a character string will be described. Specifically, an example of a case in which the input data DI is a character string image in which "011" is handwritten in the horizontal direction from left to right will be described.

The neural network NN1 calculates a series of feature quantities F of an input character string. When the input data DI is a character string image handwritten in the horizontal direction from left to right, the neural network NN1 recognizes the series of the feature quantities F from left to right as much as a width of a determination range. In this example, the neural network NN1 calculates feature quantities from a feature quantity F1 to a feature quantity F6. Here, the neural network NN1 calculates the number of feature quantities F in accordance with a line length of the input data DI.

The neural network NN2 calculates the probability distribution P for each feature quantity F calculated by the neural network NN1. In this example, since the neural network NN1 calculates feature quantities from the feature quantity F1 to the feature quantity F6, a neural network NN2 calculates a probability distribution P1 corresponding to the feature quantity F1 to a probability distribution P6 corresponding to the feature quantity F6.

The CTC 80 integrates each calculated probability distribution, calculates the probability distribution P of a character string corresponding to the input data DI, and outputs the character string recognized from the calculated probability distribution P as output data DO.

The information processing device 10 acquires the feature quantity F calculated by the neural network NN1. The information processing device 10 estimates a range in which an element to which a predetermined label is to be assigned from the feature quantity F acquired by a neural network NN3 can be present.

The information processing device 10 associates each label of the output data DO recognized by the CTC 80 with each feature quantity F. When one label in the label string of the output data DO is associated with a plurality of feature quantities F, the information processing device 10 integrates ranges estimated from the plurality of feature quantities F associated with the one label, and outputs them. The output result output by the information processing device 10 specifies the ranges of each label in the input data DI. In the example shown in FIG. 1, a range A1 specifies a range of "0," a range A2 specifies a range of "1," and a range A3 specifies a range of "1."

Figure 2:
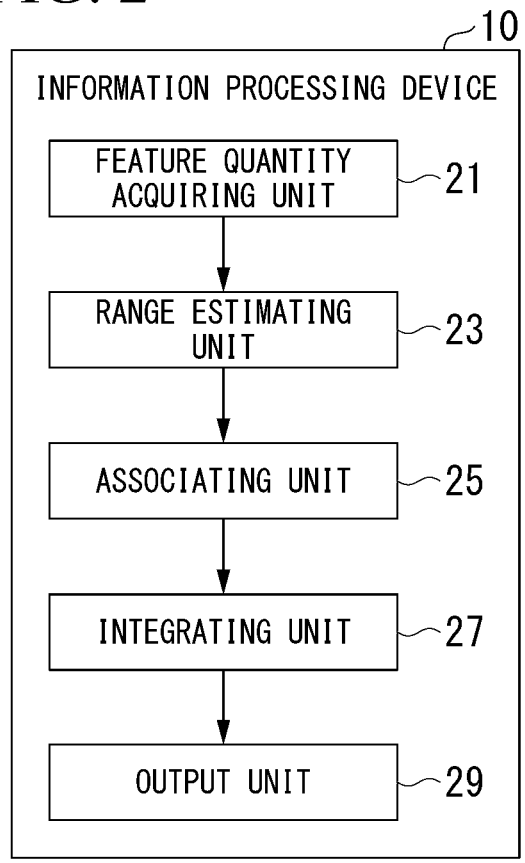
FIG. 2 is a block diagram which shows a schematic functional configuration of an information processing device according to the first embodiment.

FIG. 2 is a block diagram which shows a schematic functional configuration of the information processing device 10 according to the first embodiment. As shown in FIG. 2, the information processing device 10 includes a feature quantity acquiring unit 21, a range estimating unit 23, an associating unit 25, an integrating unit 27, and an output unit 29. Each of these functional units is realized using, for example, electronic circuits. In addition, each functional unit may be internally provided with a storage means such as a semiconductor memory or a magnetic hard disk device, when necessary. In addition, each function may be realized by a computer and software.

The feature quantity acquiring unit 21 acquires the feature quantity F extracted from the input data DI. For example, the feature quantity F is extracted by a neural network from the input data DI. The feature quantity F acquired by the feature quantity acquiring unit 21 is a feature quantity F according to a dimension of the input data DI. That is, the feature quantity acquiring unit 21 acquires the feature quantity F according to the dimension of the input data DI, which is a feature quantity F extracted from data consisting of a plurality of values.

The range estimating unit 23 estimates a range of the input data DI in which an element to which a predetermined label is to be assigned can be present from the acquired feature quantity F. The range estimating unit 23 is, for example, a neural network learned to predict a range of the data in which an element to which a label is to be assigned can be present for the acquired feature quantity F.

Specifically, the range estimating unit 23 predicts where each character is present if it is supposed to be present in a range of an input image corresponding to each feature quantity F for (K−1) classes, that is, characters, excluding a blank. In the present embodiment, a neural network learned to predict a distance to a left end and a distance to a right end of each character from a D-dimensional feature vector is used. Since the neural network converts a D-dimensional vector into a (K−1)×2-dimensional vector, T×(K−1)×2 values are finally obtained from T feature vectors. The distance to the left end and the distance to the right end are used because a range of an axis that is not in a character string direction (a height direction in the present embodiment) is often not important when a position of a character from a character string image is estimated. Although the amount of calculation increases, it may be configured so that a height direction can also be predicted.

In the present embodiment, a quantity to be predicted by the neural network to estimate a range may be a vector to a center of the range and a width of the range or the vector to the center of the range and a distance to a nearest boundary. By using such an estimated quantity, a character range can be easily obtained. In addition, in the case of voice recognition or video recognition, a network learned to predict a start time and an end time for each label based on a D-dimensional vector may also be used.

The associating unit 25 associates each label of a label string having a plurality of labels with at least one of a plurality of feature quantities F. Specifically, the associating unit 25 estimates likelihood of a class from the feature quantity F, and associates a label of the label string with feature quantities F where the likelihood of a class satisfies a predetermined condition.

More specifically, the associating unit 25 estimates K class probability distribution that is a probability distribution including a predetermined label and a blank and is a probability distribution of K classes from the series of feature quantities F of a length T extracted from the input data DI. In addition, the associating unit 25 uses a label conversion means B for converting a redundant label string including blanks of the length T into a label string including no blanks of a length L smaller than T and obtains a maximum likelihood label string with a highest generation probability from the probability distribution series that is a series of the probability distributions among the redundant label strings of the length T, converted into label strings. The associating unit 25 associates each label in a label string with the feature quantity F based on the maximum likelihood label string.

More specifically, the associating unit 25 associates each character in the maximum likelihood character string with one or more feature vectors. In the present embodiment, a label string having the highest probability (hereinafter referred to as a maximum likelihood path) among the label strings of the length T that can be converted into maximum likelihood character strings by the label conversion means B is associated. In the present embodiment, the label conversion means B uses a many-to-one conversion that converts a label string of the length T including blank labels into a label string of the length T or less by deleting labels that are continuous with blank labels. Due to properties of conversion B, it is guaranteed that each character in the maximum likelihood character string corresponds to a partial label string in the maximum likelihood path exclusively and in order. "Exclusive" means that no character in the maximum likelihood character string corresponds to the same label in the maximum likelihood path. For example, if the maximum likelihood character string is "011" and the maximum likelihood path is "0-11-1" (− is a blank label), a first character of the maximum likelihood character string corresponds to a first character of the maximum likelihood path, a second character of the maximum likelihood character string corresponds to a third character and a fourth character of the maximum likelihood path, and a third character of the maximum likelihood character string corresponds to a sixth character of the maximum likelihood path. Since the maximum likelihood path has a one-to-one correspondence with T Kclass probability distributions, it also has a one-to-one correspondence with T feature vectors.

The integrating unit 27 integrates ranges of data estimated from each of one or more feature quantities F associated with a label. Processing performed by the integrating unit 27 is also referred to as integration processing. When a plurality of feature quantities F are associated with one label, the integrating unit 27 integrates a plurality of ranges of data estimated from each of the plurality of feature quantities F, and defines the result as a range of data after integration processing. In addition, when one label is associated with one feature quantity F, the integrating unit 27 sets the associated one range of data as the range of data after integration processing. The integrating unit 27 integrates the ranges estimated from each of the associated one or more feature quantities F for each label using a weighted average.

A weight of the weighted average may be calculated to be increased as a data region from which each feature quantity is extracted is closer to partial boundaries of the range.

The integrating unit 27 integrates the ranges predicted from feature vectors associated with each character in the maximum likelihood character string. The integrating unit 27 sets, when one feature vector is associated with one character, the integrated range as a character range whose character class range is final among the ranges predicted for each class from the feature vector.

When a plurality of feature vectors are associated with one character, the integrating unit 27 integrates a plurality of ranges predicted for the character class, and sets the integrated range as a character range whose character class range is final. The integrating unit 27 may integrate a plurality of ranges in a method such as a weighted average or the like in consideration of a position of an input image corresponding to the feature quantity F, in addition to an average, a median, and a mode.

Figure 3:
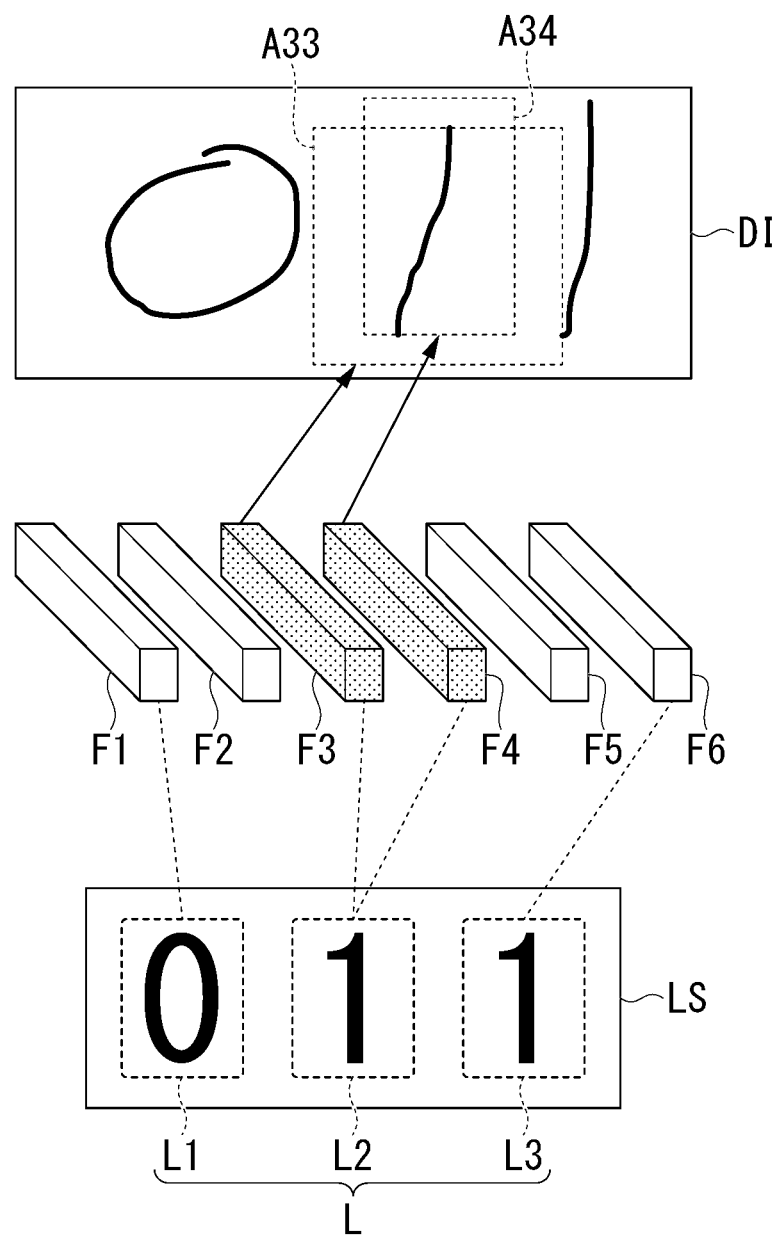
FIG. 3 is a diagram which shows processing when a label is associated with a plurality of feature quantities according to the first embodiment.

Here, an example of a case in which the integrating unit 27 performs the integration using a weighted average when a plurality of feature vectors are associated with one character will be described with reference to FIGS. 3 and 4. FIG. 3 is a diagram which shows processing when a label L is associated with a plurality of feature quantities F according to a first embodiment. As shown in FIG. 3, a label string LS has a plurality of labels L. Specifically, the label string LS has a label 11, a label 12, and a label 13. In this example, the label 11 is associated with a feature quantity F1, the label 12 is associated with a feature quantity F3 and a feature quantity F4, and the label 13 is associated with a feature quantity F6. That is, a plurality of feature quantities F are associated with the label 12.

In the input data DI, a range A33 is a range specified by the feature quantity F3. A range A34 is a range specified by the feature quantity F4. In such a case, an example of a case in which the integrating unit 27 performs the integration using a weighted average in consideration of the position of the input image will be described with reference to FIG. 4. FIG. 4 is a diagram for describing weighting when the label L is associated with a plurality of feature quantities according to the first embodiment.

FIG. 4(A) is a diagram which shows a weight for each feature quantity F. FIG. 4(A) shows weights of a left end, a right end, a top end, and a bottom end in a range for each feature quantity F. As shown in FIG. 4(A), a weight of the left end of the feature quantity F3 is "1.0," a weight of the right end is "0.0," a weight of the top end is "0.5," and a weight of the bottom end is "0.5." In addition, a weight of the left end of the feature quantity F4 is "0.0," a weight of the right end is "1.0," a weight of the top end is "0.5," and a weight of the bottom end is "0.5."

FIG. 4B is a diagram for describing each side in the range A33 and the range A34. In the following description, the left end of the range A33 is a side A33L, the right end is a side A33R, the top end is a side A33T, and the bottom end is a side A33B. Moreover, the left end of the range A34 is described as a side A34L, the right end is described as a side A34R, the upper end is described as a side A34T, and the bottom end is described as a side A34B.

Figure 4:
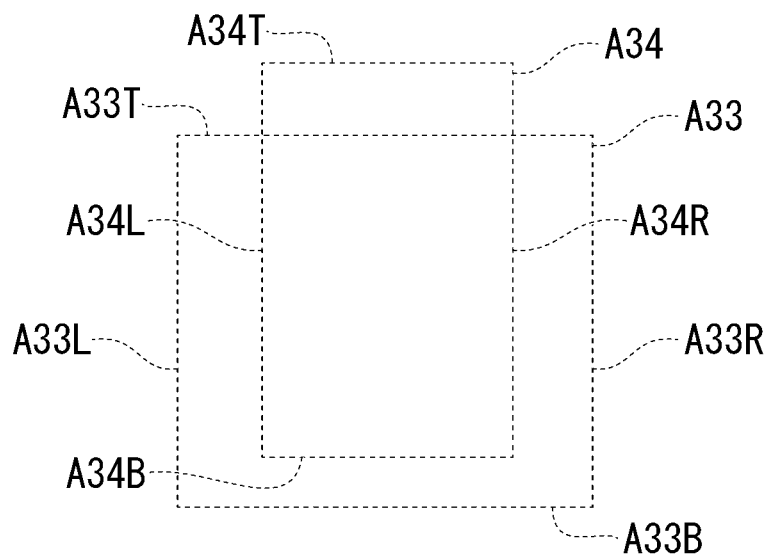
FIG. 4 is a diagram for describing weighting when a label is associated with a plurality of feature quantities according to the first embodiment.
Figure 4:
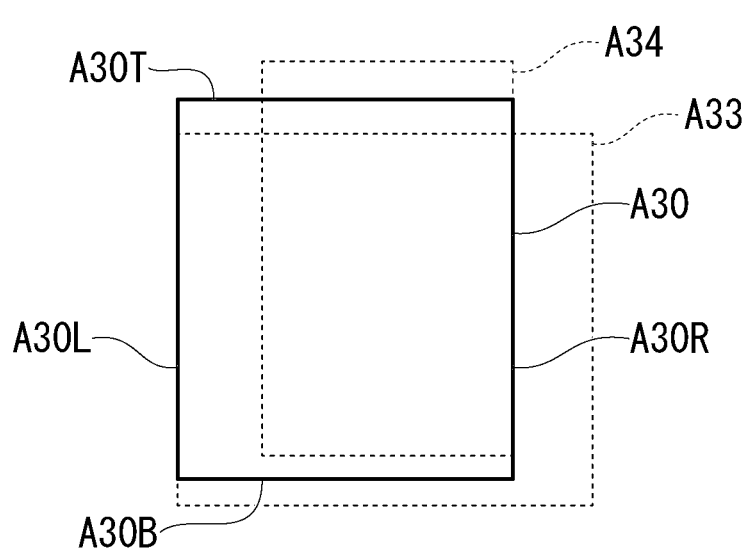

FIG. 4© is a diagram which shows a range A30 when the integrating unit 27 performs the integration using a weighted average. The left end of the range A30 is described as a side A30L, the right end is described as a side A30R, the top end is described as a side A30T, and the bottom end is described as a side A30B. In this example, as for a weight of the left end, the weight of the feature quantity F3 is "1.0" and the weight of the feature quantity F4 is "0.0," so that the integrating unit 27 prioritizes the result of the feature quantity F3 (that is, the left end A33L of the range A34) and sets the left end as the side A30L. In addition, as for a weight on the right end, the weight of the feature quantity F3 is "0.0" and the weight of the feature quantity F4 is "1.0," so that the integrating unit 27 prioritizes the result of the feature quantity F4 (that is, the right end A34R of the range A34), and sets the right end as the side A30R. In addition, as for a weight of the top end, the weight of the feature quantity F3 is "0.5" and the weight of the feature quantity F4 is "0.5," so that the integrating unit 27 sets a simple average of the feature quantity F3 and the feature quantity F4 (that is, a middle between the top end A33T of the range A33 and the top end A34T of the range A34) as the side A30T. As for a weight of the bottom end, the weight of the feature quantity F3 is "0.5" and the weight of the feature quantity F4 is "0.5," so that the integrating unit 27 sets a simple average of the feature quantity F3 and the feature quantity F4 (that is, a middle between the bottom end A33B of the range A33 and the bottom end A34B of the range A34) as the side A30B.

As described with reference to FIGS. 3 and 4, the integrating unit 27 performs the integration using a weighted average, thereby more strongly reflecting, for example, a range estimated from a feature quantity corresponding to a left of an input image (a feature quantity close to F1 in FIG. 3) at a left end of a character, and a range estimated from a feature quantity corresponding to the right (a feature quantity closer to F6 in FIG. 3) at a right end of the character.

Returning to FIG. 2, the output unit 29 outputs a correspondence relationship between a label of the input data DI and a range of the label. Since the range of the label is integrated by the integrating unit 27 as described above, it is associated with the label on a one-to-one basis. The output unit 29 outputs, for example, the correspondence relationship between the label of the input data DI and the range of the label to a storage unit (not shown), a display unit (not shown), or the like.

Figure 5:
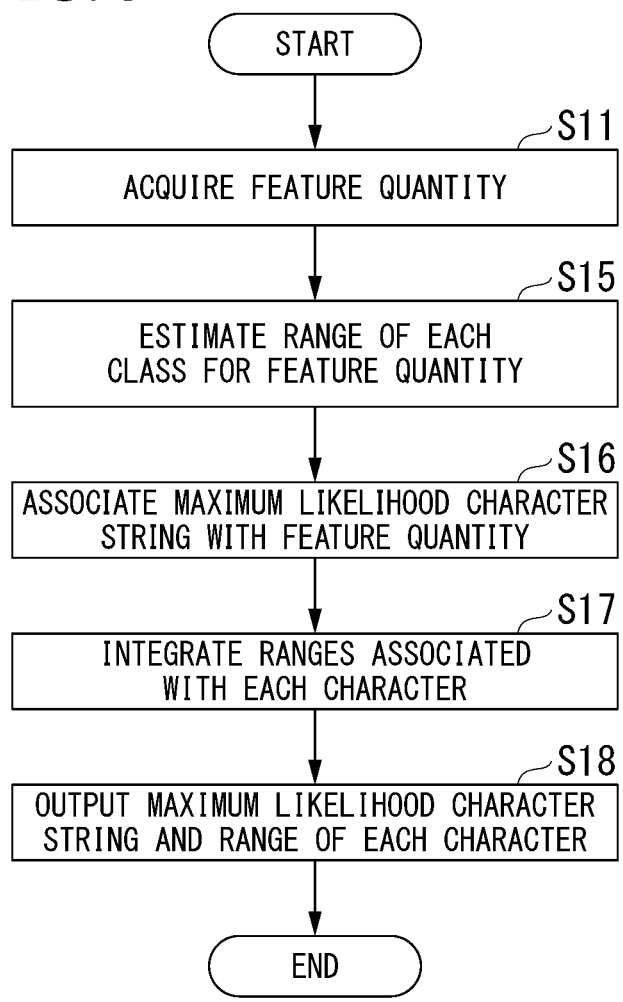
FIG. 5 is a flowchart which shows a series of operations of the information processing device according to the first embodiment.

FIG. 5 is a flowchart which shows a processing procedure of the information processing device 10 according to the present embodiment. In the following description, the procedure will be described according to this flowchart.

In step S11, the feature quantity acquiring unit 21 acquires the feature quantity F extracted from the input data DI. In step S15, the range estimating unit 23 estimates ranges of each class for the feature quantity F. In step S16, the associating unit 25 associates the maximum likelihood character string with the feature quantity F. In step S17, the integrating unit 27 integrates ranges associated with each character. In step S18, the output unit 29 outputs the maximum likelihood character string and the ranges of each character.

Summary of First Embodiment

According to the embodiment described above, the information processing device 10 includes the range estimating unit 23 and the associating unit 25, thereby estimating a range of data in which an element to which a predetermined label is to be assigned can be present from the acquired feature quantity F, and associating a label with at least one of a plurality of feature quantities F. The information processing device 10 includes the integrating unit 27, thereby integrating a plurality of ranges associated with one label. That is, according to the embodiment described above, the information processing device 10 can specify the range of input data corresponding to each label in a label string that is a result of recognition.

Moreover, according to the embodiment described above, the information processing device 10 can specify the range of the input data DI corresponding to each label in the label string that is the result of recognition, so that it can present a range of the label string that is the result of recognition to a user in the input data DI. For example, the information processing device 10 can make it possible to interpret the result of recognition by presenting a result of an output to the user through a GUI. Furthermore, according to the embodiment described above, the interpretation of recognition results is made possible, so that the information processing device 10 can easily find and correct an error in recognition. That is, according to the present embodiment, the information processing device 10 can improve explanation of recognition results. In addition, according to the present embodiment, since it is possible to improve the explanation of recognition results, the information processing device 10 can easily correct erroneous recognition using position information. In addition, since a label string is certified by a CTC method in the present embodiment, it is possible to recognize a label string with the same accuracy as in the CTC method.

In addition, according to the embodiment described above, a label string is certified by the CTC method, and the range is specified by a neural network different from the CTC. Therefore, according to the embodiment described above, it is possible to specify the ranges of input data corresponding to each label in a label string that is the result of recognition without affecting a character recognition accuracy of the CTC method.

In addition, as a modification of the present embodiment, the information processing device 10 may also be configured to correct the result of recognition so as to automatically reduce erroneous recognition from the obtained ranges of each character. For example, this can be realized by the range estimating unit 23 estimating the ranges of each character not only for the maximum likelihood character string but also for an N-th character string, giving penalties to a candidate with an excessively large overlap in the ranges of each character and a candidate estimated to have no characters at a position where a character is to be present, and determining a final output character string. In addition, the present embodiment can also be applied to beam search decoding, which is widely used for CTC decoding. In this case, when beam candidates are scored in each loop, penalties may be given to beams with a large overlap between characters or beams estimated to have no characters at a position where a character is to be present. As described above, by automatically correcting recognition results in consideration of range information, it is possible to realize a character recognition system with high recognition accuracy.

Second Embodiment

Figure 6:
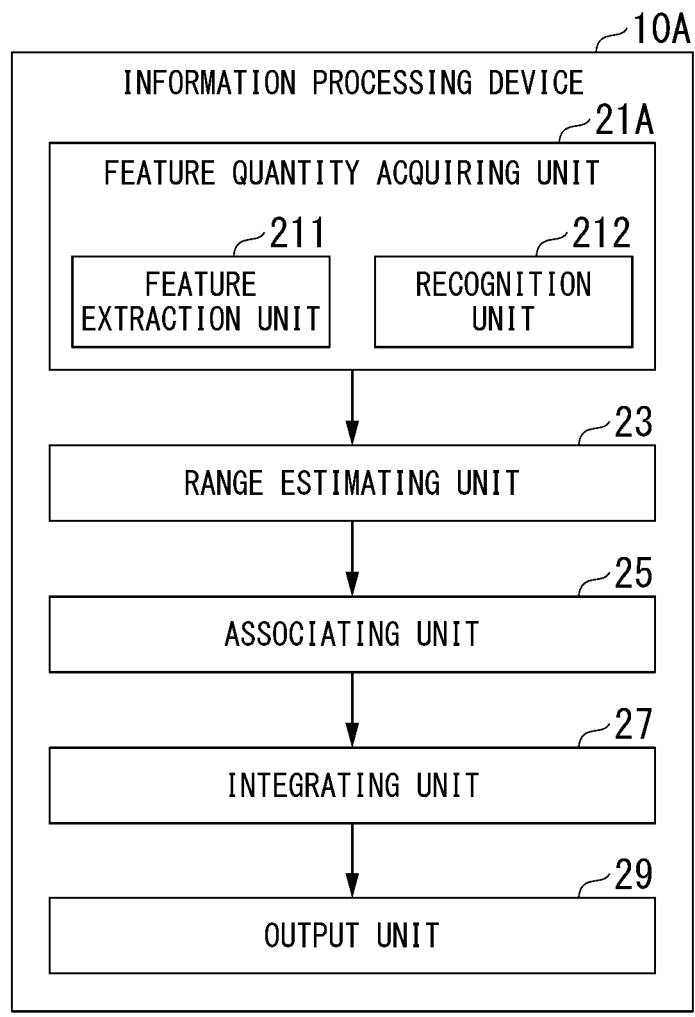
FIG. 6 is a block diagram which shows a schematic functional configuration of an information processing device according to a second embodiment.

An example of an information processing device 10A according to a second embodiment will be described with reference to FIGS. 6 and 7. FIG. 6 is a block diagram which shows a schematic functional configuration of the information processing device 10A according to the second embodiment. The information processing device 10A differs from the information processing device 10 in that it includes a feature quantity acquiring unit 21A instead of the feature quantity acquiring unit 21. Constituents the same as those described in FIG. 2 will be denoted by the same reference numerals, and the description thereof may be omitted.

The feature quantity acquiring unit 21A includes a feature extraction unit 211 and a recognition unit 212. In the present embodiment, the feature quantity acquiring unit 21A includes the feature extraction unit 211 and the recognition unit 212, thereby extracting a feature quantity from input data DI and recognizing a label string.

The feature extraction unit 211 extracts feature quantities F from the input data DI. The input data DI is data consisting of one or more values. That is, the feature extraction unit 211 extracts a plurality of feature quantities F from data consisting of one or more values.

When the input data DI is image data, the feature extraction unit 211 calculates a series of the feature quantities F from a character string image. For example, an example of a case in which an input image is converted into T D-dimensional feature vectors v1, v2, . . . , and vT by a convolutional neural network (CNN) will be described. A recurrent neural network (RNN) may be inserted in a middle or at an end of a CNN.

Here, since T feature vectors are calculated from different sub-images of the input image by the CNN, there is a spatial correspondence relationship between the character string image and the T feature vectors. This correspondence relationship depends on a structure of the CNN, and is determined by, for example, sliding a rectangle with a height of 128 px and a width of 128 px by 4 px from the left. In the present embodiment, v1 to vT correspond to a left end to a right end of the image in order.

The recognition unit 212 recognizes a label string from the plurality of feature quantities F. The recognition unit 212 calculates probability distributions pn (n=1, 2, . . . , and T) of K classes based on each feature quantity vn, and performs CTC decoding on these T K class probability distributions p1, p2, . . . , and pT to calculate a maximum likelihood character string with a highest probability. The K classes are classes obtained by adding a blank class representing a blank to classes to be originally recognized. For example, in a task of recognizing a string of numbers in which numbers 0 to 9 appear, a blank class is added to 10 classes of 0 to 9 that need to be originally recognized, resulting in K=11.

CTC decoding is a decoding method generally used in label string recognition using CTC. In the CTC decoding, a many-to-one conversion B is used to convert a label string of a length T including a blank label into a label string of the length T or less by deleting labels that are continuous with a blank label. A likelihood of a label string LS of the length T or less that does not include a blank is calculated as a total sum of generation probabilities (p1(l1)*p2(l2)* . . . *pT(lT)) of label strings LS' (l1, l2, . . . , and lT) of the length T including a blank that can be converted into L by B. The maximum likelihood label string with a highest probability is calculated according to the rules described above.

Generally, in character string recognition and speech recognition, processing of correcting the scoring of recognition results is performed using pre-prepared grammatical rules, language model information such as N-grams, and word list matching. Even in the present embodiment, the maximum likelihood character string may be determined in consideration of such linguistic information.

Note that the recognition unit 212 may perform decoding by a greedy method, which is an approximation method capable of high-speed processing, instead of CTC decoding.

In this case, the maximum likelihood character string is a character string obtained by converting a label string in which labels with the highest probability are arranged in order of feature vector from T K class probability distributions by using B.

Figure 7:
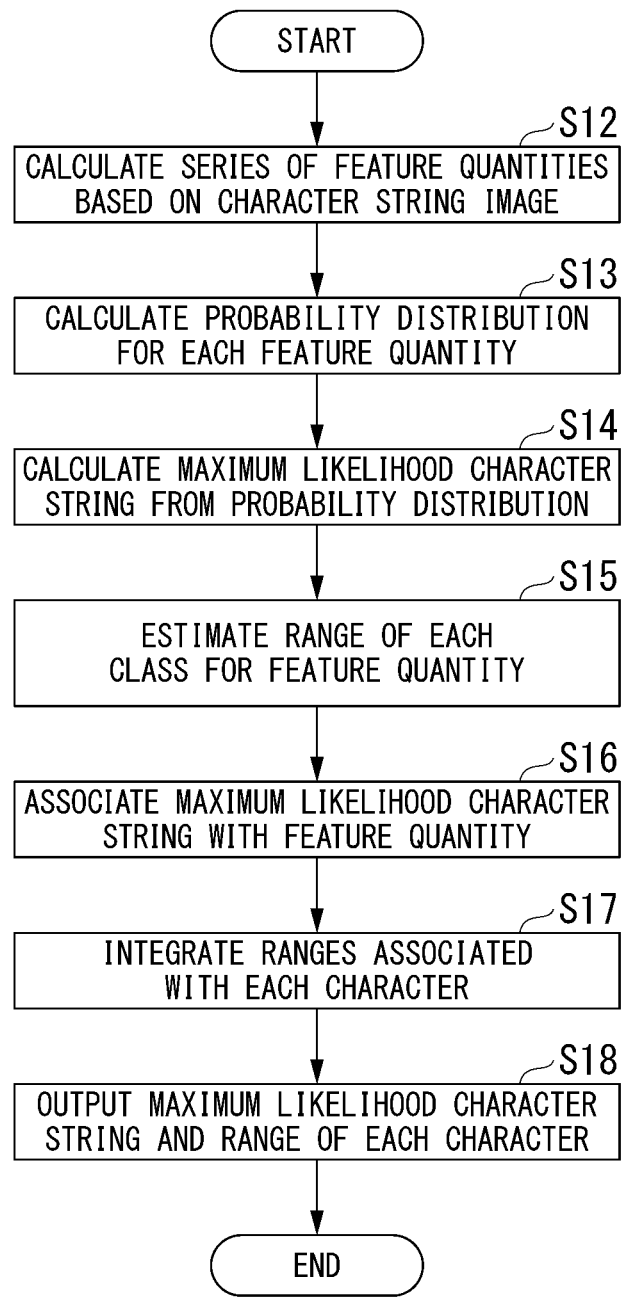
FIG. 7 is a flowchart which shows a series of operations of the information processing device according to the second embodiment.

FIG. 7 is a flowchart which shows a series of operations of the information processing device 10A according to the second embodiment. In the following description, a procedure will be described according to this flowchart. The flowchart shown in FIG. 7 is different from the flowchart which shows a series of operations of the information processing device 10 described in FIG. 5 in that it has steps S12, S13, and S14 instead of step S11. Description of contents described in FIG. 5 will be omitted.

In step S12, the feature extraction unit 211 calculates a series of feature quantities F based on the input data DI. In step S13, the recognition unit 212 calculates a probability distribution for each feature quantity. In step S14, the recognition unit 212 calculates a maximum likelihood character string from the calculated probability distribution.

Summary of Second Embodiment

According to the embodiment described above, the information processing device 10A includes the feature extraction unit 211, thereby calculating a series of the feature quantities F from the input data DI. That is, according to the present embodiment, the feature quantity acquiring unit 21 can calculate the feature quantity F from the input data DI instead of acquiring the feature quantity F calculated by the neural network NN1.

In addition, according to the embodiment described above, the information processing device 10A includes the recognition unit 212, thereby recognizing a label string from the plurality of feature quantities F. That is, according to the present embodiment, series label recognition can be performed by the series label recognition technology such as the neural network NN2 and the CTC.

Third Embodiment

In the embodiment described above, an example of a case in which the CTC method is used as an example of the series label recognition technology has been described. In the present embodiment, an example of a case in which the series label recognition technology is performed using an attention method instead of the CTC method will be described. For example, it is known that the CTC method and the attention method are different in their superiority in terms of character recognition accuracy depending on an application. For example, the CTC method is advantageous in recognizing a scanned handwritten character string, and the attention method is advantageous in recognizing a character string imaged by a camera.

Figure 14:
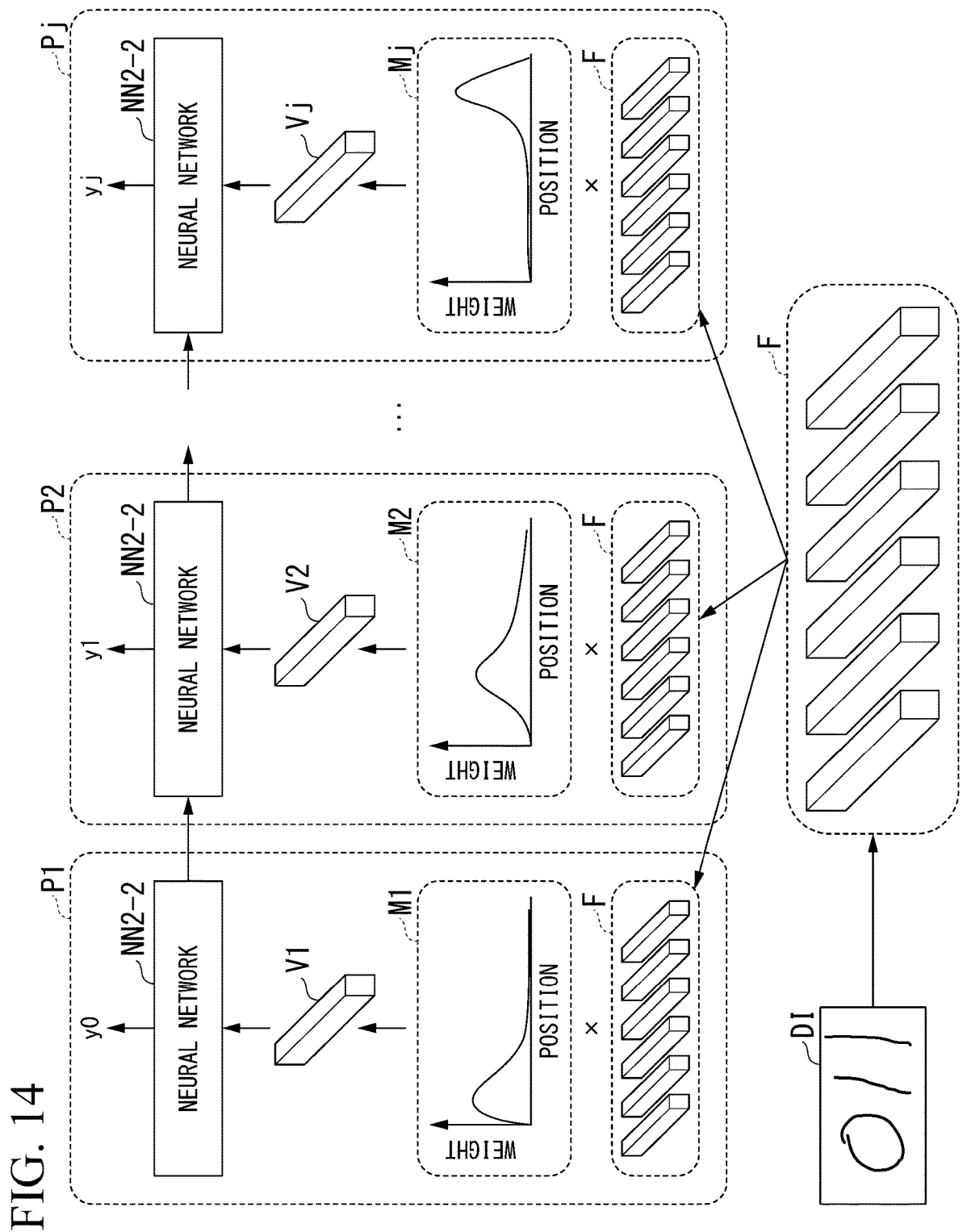
FIG. 14 is a diagram which describes the determination range of the series label recognition technology using an attention method according to the prior art.

First, a prior art will be described with reference to FIG. 14. FIG. 14 is a diagram for describing a determination range of the series label recognition technology using the attention method according to the prior art. As shown in FIG. 14, first, the feature quantity F is extracted from input data DI. The feature quantities F are extracted by, for example, a neural network (not shown). In this example, an example of a case in which the input data DI is an image will be described.

It is assumed that a process of estimating an n-th character of the input data DI is a process Pn (n is a natural number). When EOS (End Of String) representing an end of a character string is estimated at a process Pj (j is a natural number), in the series label recognition technology using the attention method, a character string corresponding to the input data DI is estimated by processes from the process P1 to the process Pj.

In the series label recognition technology using the attention method, the feature quantity F is copied in the process P1. The copied feature quantity F is multiplied by an attention map (weight map) M1 to calculate a weighted sum. The calculated weighted sum is described as a feature vector V1. Here, in the attention map M1, the horizontal axis indicates a position of the input data DI, and the vertical axis indicates a weight. Since the attention map M1 corresponds to a character range at the left end of the input data DI, a weight of the left end is greater than a weight of the right end.

The calculated feature vector V1 is input to a neural network NN2-2. The neural network NN2-2 predicts a label y0 of a first character. Specifically, the neural network NN2-2 estimates which character is most likely to be the first character. By repeating the process P1 to the process Pj in this manner, in the series label recognition technology using the attention method, all character strings of the input data DI are predicted.

Note that the attention map M may be created by a neural network NN2-1 (not shown). In this case, the neural network NN2-1 creates the attention map M according to a character on the left side (for example, in the process P2, the character estimated in the process P1), an internal state of the neural network NN2-2 when the character is predicted, and a feature quantity F.

Note that the neural network NN2-2 may also predict a character according to a character on the left side (for example, in the process P2, the character estimated in the process P1), an internal state of the neural network NN2-2 when the character is predicted, and a feature vector V. In this case, the neural network NN2-2 is a recurrent neural network. In this manner, character prediction is repeated until EOS (End Of String) is predicted in the series label recognition technology using the attention method.

Figure 8:
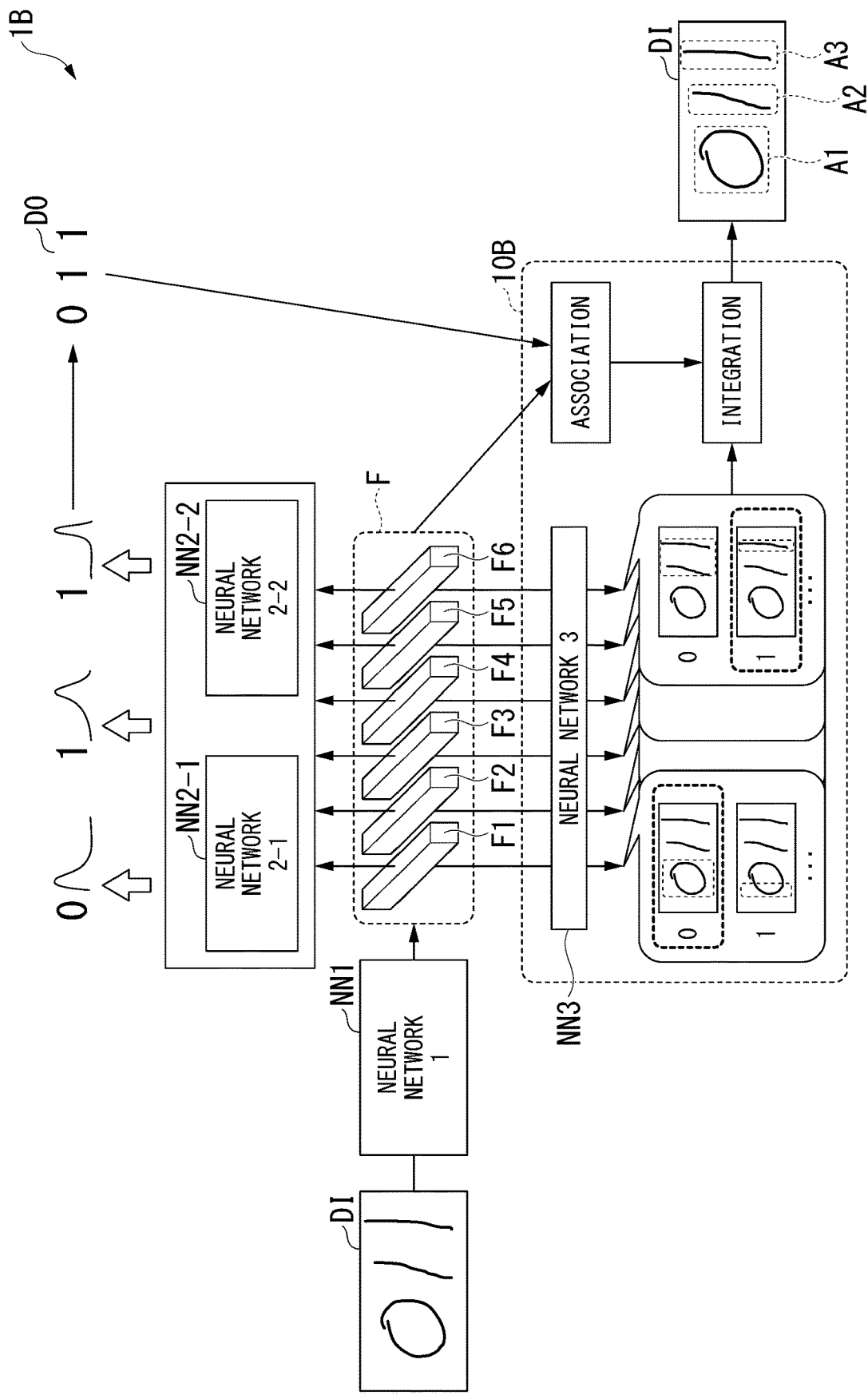
FIG. 8 is a schematic diagram which shows an example of a functional configuration of an information processing system according to a third embodiment.

FIG. 8 is a schematic diagram which shows an example of a functional configuration of an information processing system 1B according to a third embodiment. A functional configuration of the information processing system 1 will be described with reference to FIG. 8. First, the input data DI is input to the neural network NN1. In this example, an example of a case in which the input data DI is an image of a character string will be described. Specifically, an example of a case in which the input data DI is a character string image in which "011" is handwritten in the horizontal direction from left to right will be described.

In the present embodiment, an information processing device 10B associates each label of the output data DO calculated by the attention method with the feature quantities F calculated by the neural network NN1. When each label of the output data DO that is calculated by the attention method is associated with the plurality of feature quantities F, the information processing device 10B integrates ranges estimated from one or more feature quantities F associated with a label, and outputs the result. In the output result output by the information processing device 10, ranges of each label in the input data DI are specified. In the example shown in FIG. 8, a range A1 specifies a range of "0," a range A2 specifies a range of "1," and a range A3 specifies a range of "1."

Specifically, in the present embodiment, the feature extraction unit 211 calculates T feature vectors v1, v2, . . . , and vT in the same manner as in the embodiments described above. The recognition unit 212 first inputs T feature vectors to a neural network 2-1, and weights feature vectors useful for recognition of a first character. Here, there are T values w1, w2, . . . , and wT whose sum is one with each weight in a range of 0 to 1. From a weighted average (w1*v1+ . . . +wT*vT) of T feature vectors using these weights, another neural network 2-2 is further used to recognize the first character.

Next, a recognition result of the first character and features obtained in a process of the recognition are also added to an input of the neural network 2-1 to weight a feature vector useful for the recognition of a second character. The second character is recognized using the neural network 2-2 based on the weighted average of T feature vectors using these weights. In the following description, this is repeated until the neural network 2-2 outputs EOS indicating the end of a character string. The maximum likelihood character string is a sequence of characters from the first character to EOS.

The range estimating unit 23 predicts the ranges of each class for all feature vectors in the same manner as in the embodiments described above. The associating unit 25 associates the maximum likelihood character string with T feature vectors. The weights calculated for each character in the neural network 2-1 of the recognition unit 212 are used for the association. The associating unit 25 associates a feature quantity with a weight equal to or greater than a predetermined value (for example, 0.01) with each character. The integrating unit 27 may adopt a weighted sum using these weights when the ranges are integrated.

Summary of Third Embodiment

Conventionally, in the series label recognition technology using the attention method, it was not possible to specify the range of input data corresponding to each label in a label string that is a result of recognition by only using weight information. That is, according to the prior art, only a vague range could be estimated. However, according to the embodiment described above, the information processing device 10B can also specify the range of input data corresponding to each label in a label string that is a result of recognition by using the attention method instead of the CTC method.

In the present embodiment, the vague position specified by the attention method can be used to associate a range estimated by a neural network NN3 with each label of the output data DO on the basis of a predetermined threshold. When one label is associated with a plurality of feature quantities F, the range of the label can be specified by integrating the ranges in the same manner as in the first embodiment.

Fourth Embodiment

In the present embodiment, a method for saving labor for range teaching by humans will be described. Range teaching is used, for example, to create data sets for machine learning. In terms of processing, a fourth embodiment is different from the embodiments described above in that a character string whose range is to be estimated is not a result of recognition but is input from a user. The fourth embodiment will be described with reference to FIGS. 9 and 10.

Figure 9:
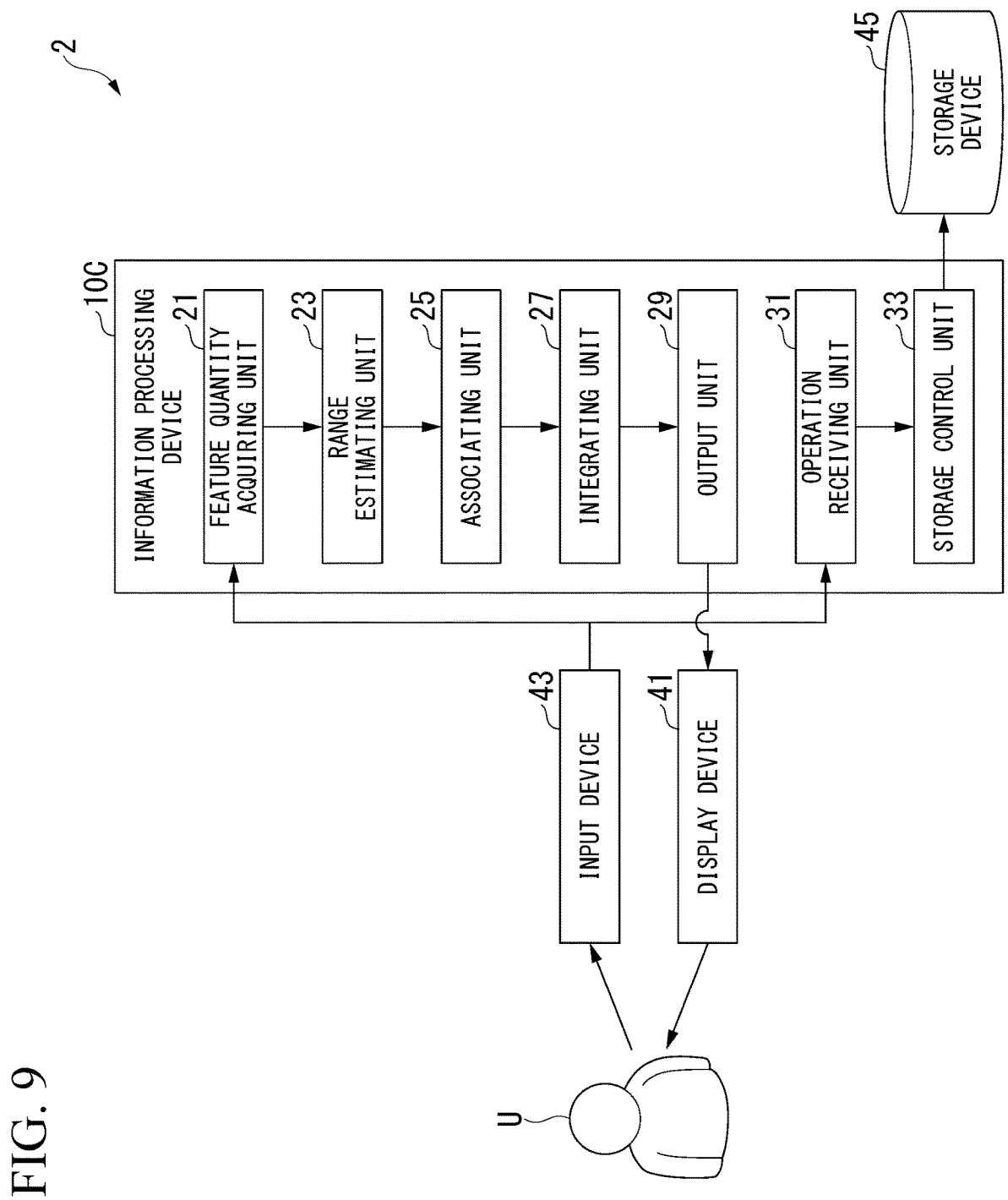
FIG. 9 is a block diagram which shows a teaching system according to a fourth embodiment.

FIG. 9 is a block diagram which shows a teaching system 2 according to the fourth embodiment. In the present embodiment, the teaching system 2 includes an information processing device 10C instead of the information processing device 10 described above. The teaching system 2 also includes a display device 41, an input device 43, and a storage device 45.

The input device 43 acquires information input from a user U and outputs it to the information processing device 10C. The input device 43 may be, for example, a character input device such as a keyboard, or a pointing device such as a mouse.

The display device 41 displays information output from the information processing device 10C. The display device 41 may be, for example, a display device such as a liquid crystal display.

The storage device 45 is a storage device controlled by the information processing device 10. The information processing device 10 may be included inside the information processing device 10C, or may be included outside the information processing device 10C.

The information processing device 10C is a modified example of the information processing device 10. The information processing device 10C is different from the information processing device 10 in that it includes an operation receiving unit 31 and a storage control unit 33. The same constituents as those in the information processing device 10 may be denoted by the same reference numerals, and description thereof may be omitted.

The operation receiving unit 31 receives an operation from the user U via the input device 43. In the present embodiment, the user U determines whether a result output by the information processing device 10C is correct. The user U inputs a result of the determination to the information processing device 10C via the input device 43. In other words, the operation receiving unit 31 acquires a result of the user U determining whether a result of the output by the output unit 29 is correct. The information acquired by the operation receiving unit 31 may include correction information instructing correction of a range estimated by the range estimating unit 23.

The storage control unit 33 causes the storage device 45 to store the result obtained by the operation receiving unit 31. When the information acquired by the operation receiving unit 31 includes correction information, the storage control unit 33 causes the storage device 45 to store the result including the correction information acquired by the operation receiving unit 31.

Figure 10:
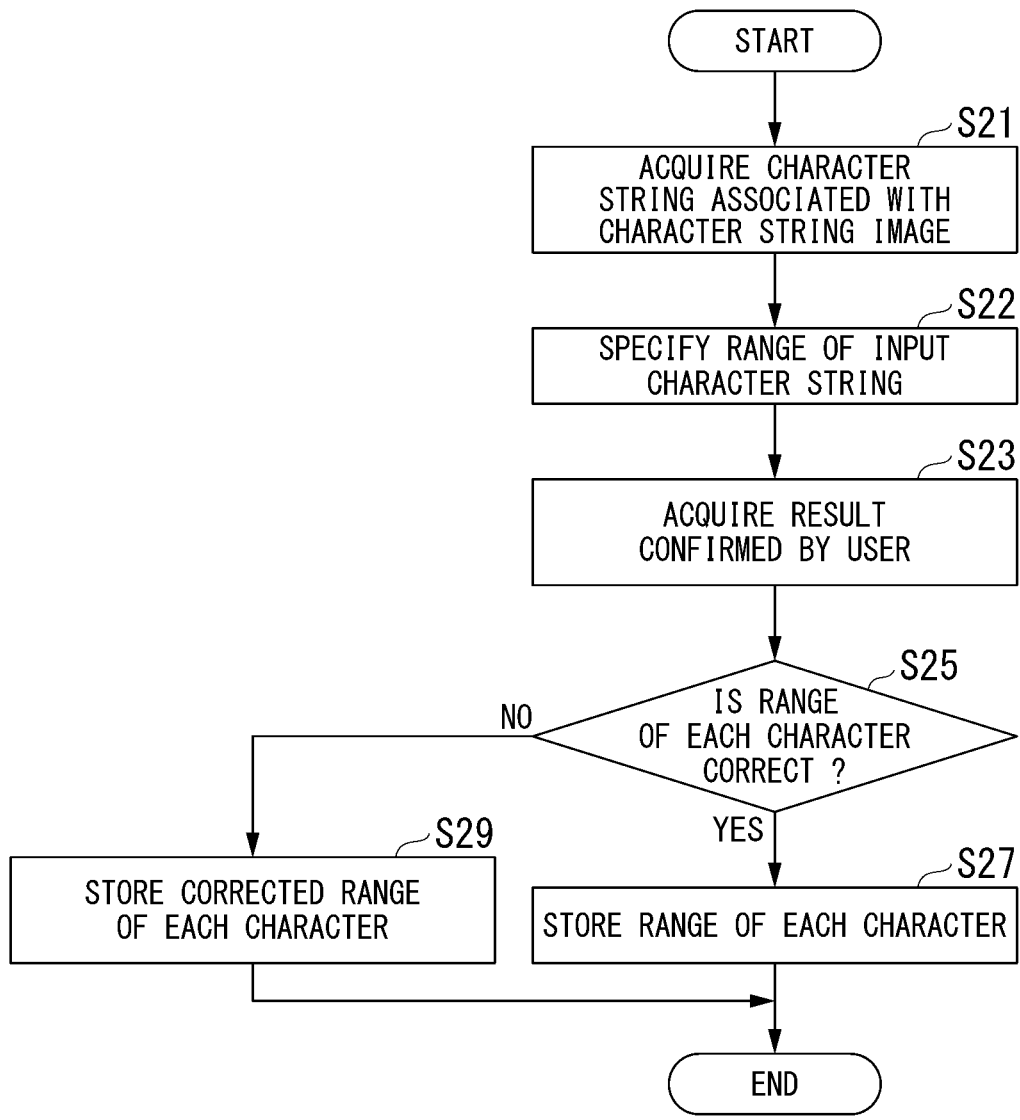
FIG. 10 is a flowchart which shows a series of operations of an information processing device according to the fourth embodiment.

FIG. 10 is a flowchart which shows a series of operations of the information processing device 10C according to the fourth embodiment. A series of operations by the information processing device 10C according to the fourth embodiment will be described with reference to FIG. 10.

In step S21, the user U first inputs a character string image and a corresponding character string. That is, the feature quantity acquiring unit 21 acquires the character string image and the corresponding character string from the user U via the input device 43. Note that the feature quantity acquiring unit 21 may be configured to store pairs of a plurality of character string images and corresponding character strings in a storage device (not shown), and to acquire the character string images and the corresponding character strings from the storage device.

In step S22, the information processing device 10C specifies a range of an input character string. First, the information processing device 10C calculates a series of feature quantities for an input character string image in the same manner as in the embodiments described above. In addition, the information processing device 10C estimates the ranges for each class from each feature quantity in the same manner as in the embodiments described above.

The associating unit 25 associates each character in the input character string with the feature quantity. The associating unit 25 obtains, for example, a label string with a highest probability among label strings of the length T that can be converted into the input character string by B from the probability distribution of K class calculated based on each feature quantity, and performs the association in the same manner as in the embodiments described above. As described in the third embodiment, the associating unit 25 may calculate weights of feature quantities until the input character string and an end character string immediately after it are output, and use the calculated weights for the association.

In addition, the associating unit 25 may roughly associate each character in the input character string with an image area based on density and brightness of an input image, and may associate a character with a feature quantity based on a positional correspondence relationship between the input image and the feature quantity. In this case, the rough association between an input image and a character may be performed by, for example, estimating a blank area where no characters are present from a brightness histogram in a character string direction, and dividing the area evenly by the number of characters after excluding these blanks. The association between the image area and the feature quantity may also be configured so as to select a feature quantity whose overlap rate between a target image area and an image area corresponding to the feature quantity is above a certain level.

The integrating unit 27 integrates ranges associated with each character in the same manner as in the embodiment described above. The output unit 29 causes the display device 41 to display the estimated ranges of each character. For example, the ranges of each character are drawn in rectangles so as to overlap the image, and characters corresponding to each rectangle are displayed.

In step S23, the user U confirms whether the ranges of each character displayed on the display device 41 are correct. The user U inputs a confirmation through the input device 43 when the estimated ranges are correct. When the estimated ranges are not correct, the user U corrects the ranges so that they become correct via the input device 43. Range teaching provides an interface for correction. As the interface for correction, for example, a method of dragging and dropping vertices and sides of rectangles using a mouse pointer or the like may be used. After completion of the correction, the user inputs a confirmation and ends the operation.

In step S25, when the ranges of each character are correct, the information processing device 10C advances the processing to step S27. When the ranges of each character are not correct, the information processing device 10C advances the processing to step S29.

In step S27, when the ranges of each character are correct, the storage control unit 33 causes the storage device 45 to store the ranges of each character. Specifically, the storage control unit 33 causes the storage device 45 to store a determined character range in association with a character string image and a character string.

In step S29, when the ranges of each character are not correct, the storage control unit 33 causes the storage device 45 to store the corrected ranges of each character.

Note that an input character string does not necessarily have to be a correct character string for a character string image. In the case of a character string that is a result of automatic recognition including errors, it is possible to confirm whether the character string is correct when the ranges are confirmed, and an interface for correction may be added. In this case, by estimating the ranges again according to the user's correction of the character string, it is possible to reduce a burden of range teaching by the user U.

Summary of Fourth Embodiment

According to the embodiment described above, the information processing device 10C includes the operation receiving unit 31 and the storage control unit 33, thereby acquiring information on whether the ranges of each character are correct from the user U, and causing the storage device 45 to store it. The information processing device 10C stores information on whether the ranges of each character are correct in the storage device 45, thereby making it possible to save labor for range teaching by humans.

As described above, a plurality of modified examples are described in the embodiments. Here, a plurality of embodiments and a plurality of modified examples may be combined and implemented as long as they can be combined.

Note that functions of the information processing device in the embodiments described above may be realized by a computer. In this case, the functions may be realized by recording a program for realizing the functions in a computer-readable recording medium, reading the program recorded in this recording medium into a computer system, and executing it. A term "computer system" used herein includes an OS and hardware such as peripheral devices. In addition, "computer-readable recording medium" refers to a portable medium such as a flexible disc, a magneto-optical disc, a ROM, a CD-ROM, a DVD-ROM, and a USB memory, or a storage device such as a hard disk embedded in the computer system. Furthermore, the "computer-readable recording medium" may also include a medium that dynamically stores a program for a short period of time, like a communication line for transmitting a program via a network such as the Internet or a communication line such as a telephone line, and a medium that holds a program for a certain period of time, like a volatile memory inside a computer system that is a server or client in that case. Moreover, the program described above may be a program for realizing a part of the functions described above, or may be a program capable of realizing the functions described above in combination with a program already recorded in the computer system.

According to at least one of the embodiments described above, by including a feature quantity acquiring unit, a range estimating unit, an associating unit, an integrating unit, and an output unit, it is possible to specify the ranges of input data corresponding to each label in a label string that is a result of recognition in recognition processing of a series of labels in which the boundaries between the labels are not explicitly separated.

Although several embodiments of the invention have been described, these embodiments are presented as examples and are not intended to limit the scope of the invention. These embodiments can be implemented in various other forms, and various omissions, replacements, and modifications can be made within a range not departing from the spirit of the invention. These embodiments and their modifications are included in the scope and spirit of the invention, as well as in the scope of the invention described in the claims and equivalents thereof.

REFERENCE SIGNS LIST

1 Information processing system
2 Teaching system

10 Information processing device
21 Feature quantity acquiring unit
211 Feature extraction unit
212 Recognition unit
23 Range estimating unit
25 Associating unit
27 Integrating unit
29 Output unit
31 Operation receiving unit
33 Storage control unit
41 Display device
43 Input device
45 Storage device
80 CTC
81 Full range
82 Determination range
85 Recognition model
90 Series label recognition technology
DI Input data
DO Output data
NN Neural network
F Feature quantity
P Probability distribution
LS Label string
L Label

The invention claimed is:

1. An information processing device comprising:
a computer including hardware; and
a memory configured to store a program to be executed by the computer,
wherein the computer is configured to, when executing the program stored in the memory:
  acquire a feature quantity extracted from image or audio data consisting of a plurality of values;
  estimate in which range within the data an element exists, if the element should have a predetermined label assigned thereto, from the acquired feature quantity;
  associate each label of a label string having a plurality of labels with at least one of a plurality of feature quantities;
  perform integration processing of integrating one or more ranges of the data estimated from each of one or more feature quantities that are associated with the at least one label of the label string into one range of the data; and
  output a correspondence relationship between the at least one label of the label string and the one range of the data that has been subjected to the integration processing.

2. The information processing device according to claim 1,
wherein the computer is configured to employ a neural network learned to predict a range of the data in which an element to which the label is to be assigned may be present for the acquired feature quantity.

3. The information processing device according to claim 2,
wherein the computer is configured to estimate likelihood of a class from the plurality of feature quantities, and associate the at least one label of the label string with the at least one feature quantity in which the likelihood of a class satisfies a predetermined condition.

4. The information processing device according to claim 2, wherein the computer is configured to:
estimate K class probability distribution that is a probability distribution including a predetermined label and a blank from a series of the feature quantities of the length T extracted from the data and is a probability distribution of K classes,
obtain, by using a label converting means for converting a redundant label string including a blank of a length T into the label string not including a blank of a length L smaller than the length T, a maximum likelihood label string with a highest generation probability from a probability distribution series that is a series of probability distributions in the redundant label string of the length T that is converted into the label string, and
associate each label of the label string with the feature quantity based on the maximum likelihood label string.

5. The information processing device according to claim 2,
wherein the computer is configured to integrate ranges of the data estimated from each of one or more associated feature quantities for each label with a weighted average, and
a weight of the weighted average is calculated to be increased as a data region from which each of the feature quantities is extracted is closer to partial boundaries of the ranges of the data.

6. The information processing device according to claim 2, wherein the computer is further configured to:
extract a plurality of feature quantities from the data consisting of one or more values, and
recognize the label string from the plurality of feature quantities.

7. The information processing device according to claim 2, wherein the computer is further configured to:
acquire a result of a user determining whether a result output by the computer is correct; and
store the acquired result.

8. The information processing device according to claim 1,
wherein the computer is configured to estimate likelihood of a class from the plurality of feature quantities, and associate the at least one label of the label string with the at least one feature quantity in which the likelihood of a class satisfies a predetermined condition.

9. The information processing device according to claim 8, wherein the computer is configured to:
estimate K class probability distribution that is a probability distribution including a predetermined label and a blank from a series of the feature quantities of the length T extracted from the data and is a probability distribution of K classes,
obtain, by using a label converting means for converting a redundant label string including a blank of a length T into the label string not including a blank of a length L smaller than the length T, a maximum likelihood label string with a highest generation probability from a probability distribution series that is a series of probability distributions in the redundant label string of the length T that is converted into the label string, and
associate each label of the label string with the feature quantity based on the maximum likelihood label string.

10. The information processing device according to claim 8,
wherein the computer is configured to integrate ranges of the data estimated from each of one or more associated feature quantities for each label with a weighted average, and
a weight of the weighted average is calculated to be increased as a data region from which each of the feature quantities is extracted is closer to partial boundaries of the ranges of the data.

11. The information processing device according to claim 8, wherein the computer is further configured to:
   extract a plurality of feature quantities from the data consisting of one or more values, and
   recognize the label string from the plurality of feature quantities.

12. The information processing device according to claim 8, wherein the computer is further configured to:
   acquire a result of a user determining whether a result output by the computer is correct; and
   store the acquired result.

13. The information processing device according to claim 1, wherein computer is configured to:
   estimate K class probability distribution that is a probability distribution including a predetermined label and a blank from a series of the feature quantities of the length T extracted from the data and is a probability distribution of K classes,
   obtain, by using a label converting means for converting a redundant label string including a blank of a length T into the label string not including a blank of a length L smaller than the length T, a maximum likelihood label string with a highest generation probability from a probability distribution series that is a series of probability distributions in the redundant label string of the length T that is converted into the label string, and
   associate each label of the label string with the feature quantity based on the maximum likelihood label string.

14. The information processing device according to claim 13,
   wherein the computer is configured to integrate ranges of the data estimated from each of one or more associated feature quantities for each label with a weighted average, and
   a weight of the weighted average is calculated to be increased as a data region from which each of the feature quantities is extracted is closer to partial boundaries of the ranges of the data.

15. The information processing device according to claim 1,
   wherein the computer is configured to integrate ranges of the data estimated from each of one or more associated feature quantities for each label with a weighted average, and
   a weight of the weighted average is calculated to be increased as a data region from which each of the feature quantities is extracted is closer to partial boundaries of the ranges of the data.

16. The information processing device according to claim 1, wherein the computer is further configured to:
   extract a plurality of feature quantities from the data consisting of one or more values, and
   recognize the label string from the plurality of feature quantities.

17. The information processing device according to claim 1, wherein the computer is further configured to:
   acquire a result of a user determining whether a result output by the computer is correct; and
   store the acquired result.

18. The information processing device according to claim 17,
   wherein the acquired result includes correction information that instructs correction of a range of the data estimated by the computer, and
   the computer is further configured to cause a result including the correction information to be stored.

19. The information processing device according to claim 1, wherein the computer is configured to associate a first label included in each of the labels with the plurality of feature quantities, and the associated plurality of feature quantities are continuous on the label string.

20. The information processing device according to claim 1, wherein the computer is configured to integrate the range of these data of a first range of a data estimated by a first feature quantity included in the plurality of feature quantities associated with each of the label and a second range of a data estimated by a second feature quantity different from the first feature quantity, when the first range of the data and the second range of the data overlap each other at least partially.

21. The information processing device according to claim 20,
   wherein the first feature quantity and the second feature quantity are continuous on the label string.

22. The information processing device according to claim 1,
   wherein the computer is configured to associate a first label included in each of the label with multiple feature quantities, and associate a second label different from the first label included in each of the label with a single feature quantity.

23. The information processing device according to claim 1,
   wherein the computer is configured to integrate, for each of the labels, a range of the data estimated from each of the one or more associated feature quantity by a weighted average.

24. A non-transitory computer-readable storage medium storing a program for causing a computer to execute
   acquiring a feature quantity extracted from image or audio data consisting of a plurality of values;
   estimating in which range within the data an element exists, if the element should have a predetermined label assigned thereto, from the acquired feature quantity;
   associating each label of a label string including a plurality of labels with at least one of a plurality of feature quantities;
   performing integration processing of integrating one or more ranges of the data estimated from each of the one or more feature quantities associated with the at least one label of the label string into one range of the data; and
   outputting a correspondence relationship between the at least one label of the label string and the one range of the data that has been subjected to the integration processing.

25. An information processing method comprising:
   acquiring a feature quantity extracted from image or audio data consisting of a plurality of values;
   estimating in which range within the data an element exists, if the element should have a predetermined label assigned thereto, from the acquired feature quantity;
   associating each label of a label string having a plurality of labels with at least one of a plurality of feature quantities;
   performing integration processing of integrating one or more ranges of the data estimated from each of the one or more feature quantities associated with the at least one label of the label string into one range of the data; and outputting a correspondence relationship between the at least one label of the label string and the one range of the data that has been subjected to the integration processing.

* * * * *